United States Patent
Zittrain et al.

(10) Patent No.: US 7,107,311 B1
(45) Date of Patent: Sep. 12, 2006

(54) NETWORKED COLLABORATIVE SYSTEM

(76) Inventors: Jonathan L. Zittrain, 112 Banks St., Cambridge, MA (US) 02138; Alexander Macgillivray, 34A Irving St., #31, Cambridge, MA (US) 02138; Charles Nesson, 5 Hubbard Park Rd., Cambridge, MA (US) 02138; Wendy Seltzer, 330 E. 54th St., Apt. 5B, New York, NY (US) 10022

( * ) Notice: Subject to any disclaimer, the term of this patent is extended or adjusted under 35 U.S.C. 154(b) by 327 days.

(21) Appl. No.: 09/610,802

(22) Filed: Jul. 6, 2000

(51) Int. Cl.
*G06F 15/13* (2006.01)

(52) U.S. Cl. .................. 709/204; 709/223; 434/323; 434/350; 434/362

(58) Field of Classification Search ................. 709/204, 709/223; 434/350, 352, 323, 362; 370/260
See application file for complete search history.

(56) References Cited

U.S. PATENT DOCUMENTS

| | | | | | |
|---|---|---|---|---|---|
| 6,002,915 | A | * | 12/1999 | Shimizu | 434/350 |
| 6,052,723 | A | * | 4/2000 | Ginn | 709/223 |
| 6,302,698 | B1 | * | 10/2001 | Ziv-El | 434/323 |
| 6,370,355 | B1 | * | 4/2002 | Ceretta et al. | 434/350 |
| 6,470,171 | B1 | * | 10/2002 | Helmick et al. | 434/362 |
| 6,507,726 | B1 | * | 1/2003 | Atkinson et al. | 434/350 |
| 6,516,340 | B1 | * | 2/2003 | Boys | 709/204 |

* cited by examiner

*Primary Examiner*—John Follansbee
*Assistant Examiner*—Jinsong Hu
(74) *Attorney, Agent, or Firm*—Wilmer Cutler Pickering Hale and Dorr LLP

(57) ABSTRACT

A system for facilitating communications over a network among participants and a moderator includes a question module for asking questions, receiving responses, grouping participants, and providing responses to other participants in a group for further response.

23 Claims, 2 Drawing Sheets

NETWORKED COLLABORATIVE SYSTEM

BACKGROUND OF THE INVENTION

The present invention relates to a system for communicating among a moderator, participants, and others in a collaborative exchange over a network.

There are a number of settings in which it is desirable for participants in a collaborative setting to be able to communicate and exchange ideas, comments, and/or suggestions electronically. For example, while a traditional classroom setting facilitates discussion which can be organized and directed by a teacher, the possibilities are more limited if the students are in different physical locations and participate electronically. In a business context, members of a development team or other group may not be able meet in one physical location or at one time, but may desire to engage in a structured collaborative project.

While it is currently possible for people to communicate by email, it would be desirable to have a system that includes multiple messaging applications grouped together, and a system that allows significant flexibility for a moderator of a discussion to control the flow of messages among participants. In addition, it would be desirable to have different types of messaging that could be used among participants or between participants and a moderator.

SUMMARY OF THE INVENTION

The present invention includes a system, a platform, and methods for accomplishing a number of tasks related to networked communications among groups of participants, particularly in connection with a collaborative development or other business project, or in an educational setting. The present invention includes a structured system for allowing participants, moderators, and adjunct personnel to interact over a network, preferably the Internet. In an educational context, the system can be part of one or more courses that could be taught over a network; with a course that is taught in person, the present system could be used to supplement such a course.

The communication system of the present invention preferably includes one or more modules and features, including a question module that allows questions to be presented by a moderator (e.g., in an educational setting, a teacher) with opening and closing times; an ability to create discussion pairs or groups, preferably from using information provided by or about the participants; an ability to route questions and comments to others, such as people with additional expertise; and the ability to archive comments. In an educational setting, the participants may be students. In a business setting, the participants may be the members of a development team or other project. The people with additional expertise may be consultants or other employees who are not part of a project, or other faculty members.

The system thus provides a flexible mechanism for a moderator to create a network of dialogue among participants and optionally with other adjunct personnel. The system also allows interaction with other modules, such as a registration module. While the system is described here for illustrative purposes in the context of a "teacher" with "students," the system can be used at many levels of education or can be used for other forum or group discussions that may not be "courses," such as in a business context with a moderator and participants from various business units or with different specialties or experiences in a dialogue about ideas for a product or service. The system can be used as a module or subsystem in a larger, scalable, internet education technology with other features, systems, and modules. Other features and advantages will become apparent from the following detailed description, drawings, and claims.

DETAILED DESCRIPTION

The system of the present invention is implemented through a server 10 that can be accessed by students and teachers (or more generally, participants and moderators) from personal computers 12. At the current time, a Pentium III 500 Mhz server running on Windows NT or Linux should be suitable, but other computers could be used, depending on the characteristics that the system is to have.

Figure 1:
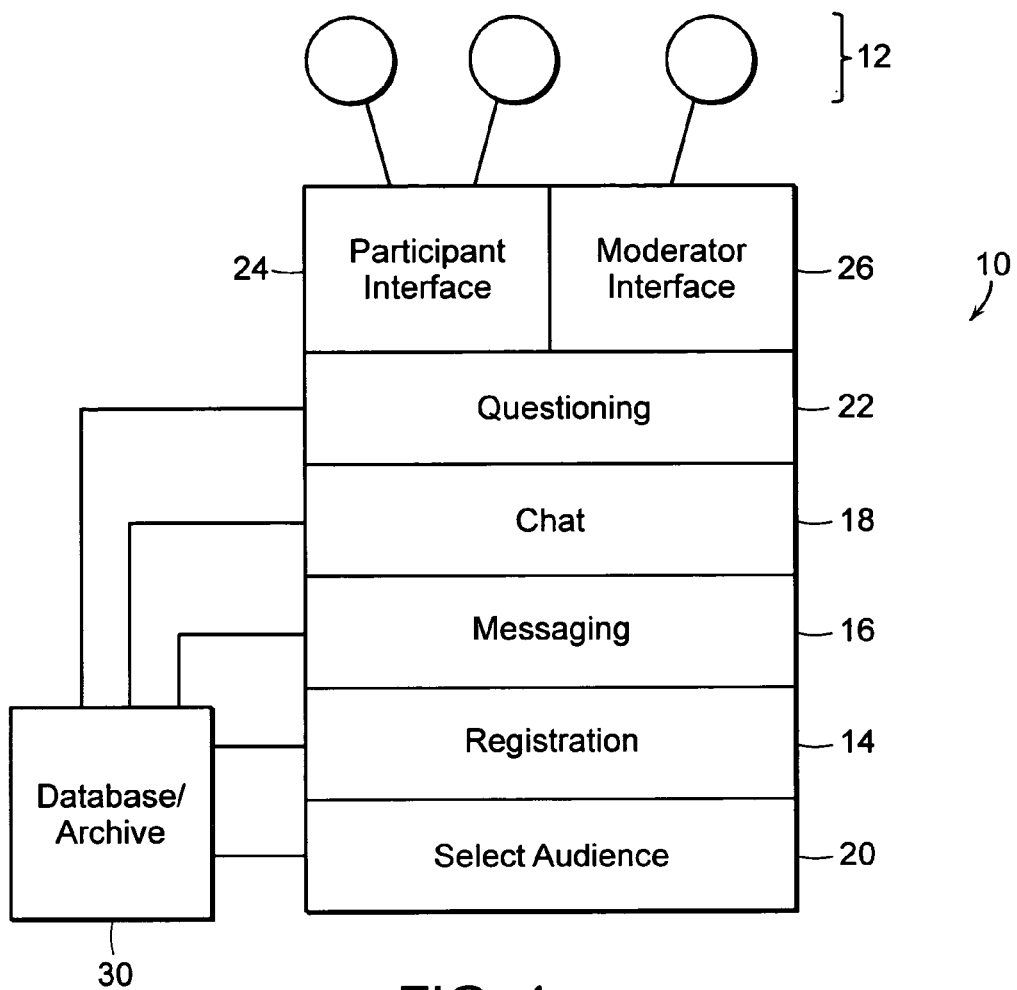
FIG. 1 is a block diagram showing modules of the system of the present invention.

Referring to FIG. 1, the system has a number of interfaces and modules in software form and capable of being stored on a disk or other storage medium. These interfaces and modules may be written as Perl scripts and implemented by the server software and hardware.

The application running on the server can include many modules, including a registration module 14, a threaded messaging module 16, a chat module 18, a select audience module 20, and a question module 22; and interfaces, including a participant (student) interface 24 and moderator (teacher) interface 26.

Registration module 14, when accessed by a student through student interface 24, provides a user input form with fields that allows the student to register with the courseware system. The student provides basic personal information, such as name and email, creates a password, and can also provide additional information that may be requested on the form. Such additional information can be requested by the teacher and can be used to classify or group students for discussion purposes. The student can identify particular courses for which he or she is registering and types of interactions (such as participant, auditor, or reduced level participant). For example, a student can thus register for two courses as a participant in the courseware and audit another course. The resulting registration data is stored in a database 30. Particularly in a business context, registration can alternatively be performed by an administrator, department head, team leader, or other appropriate person with knowledge of the backgrounds of the participants. Alternatively, if the necessary information is first provided to a database, registration can be automated.

Course data can be created and edited by the teacher for students. The student has limited access through the participant interface to allow the student to view the course data and to view his or her own registration data, but this interface does not allow the student to make changes to any such course or registration data.

Moderator interface 26 is preferably intuitive and graphical and allows for course creation and editing. The teacher can add lessons and/or sections to course data and edit those lessons and selections on the fly. The course data that is entered can be generated dynamically into HTML pages that the students can view. The teacher can choose among a set of HTML templates that can be customized by the teacher. The teacher can also create a calendar of times for openings, closings, and other dates for the course.

An administrator interface (not shown) can be provided to give access for maintenance purposes. In addition, a course administrator can have access to approve registrations prior to entry in the database.

Figure 2:
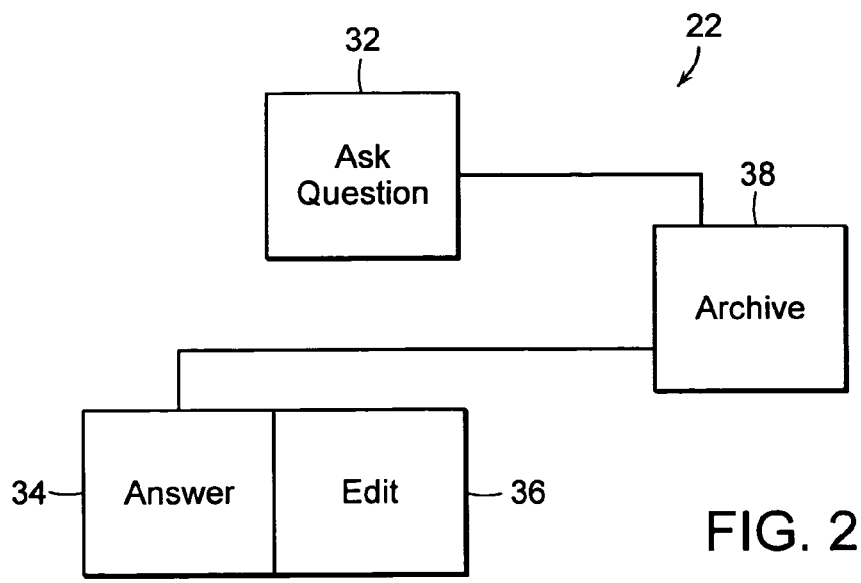
FIG. 2 is a block diagram showing modules used in the questioning module of the system.

Questioning module 22 is shown in more detail in FIG. 2, which shows a number of modules within questioning module 22. An ask question module 32 provides a form that allows a teacher to pose a question to all or part of a class or to students among several classes, such as multiple sections for one course, or for different classes with an overlapping interest. Where appropriate, such as when developing a product or service, all participants can be given access to ask question module 22, so that for a particular line of questions, any participant may serve the role of moderator, or at least be able to pose a question. Similarly, the moderator may also serve as a participant.

The question can be asked in such a way to request an answer in one of a number of different formats such as multiple choice, short answer, poll, or pro/con answers, and also to request additional comments. The question thus preferably has text, a start date, status indicating whether the teacher can use the question for other courses, specification of the audience for the question based on the select audience function, a number of rounds for interactions (described below), and a time when the question will "close." The opening and closing times thus indicate how long the students have to respond.

An answer question module 34 is effectively a response form that allows the student to answer the question. The form is preferably tailored to the type of response that is being requested by the teacher. The student can edit the response through an editing module 36 before the question closes. There can be a late answer option as well to allow a student to answer after the close of the question.

An archive module 38 associated with database 30 (FIG. 1) stores questions and answers after the answering period for the questions that have closed. The process may go through multiple rounds of responses, in which case the archive would make each round's answers available upon the closing of that round.

Figure 3:
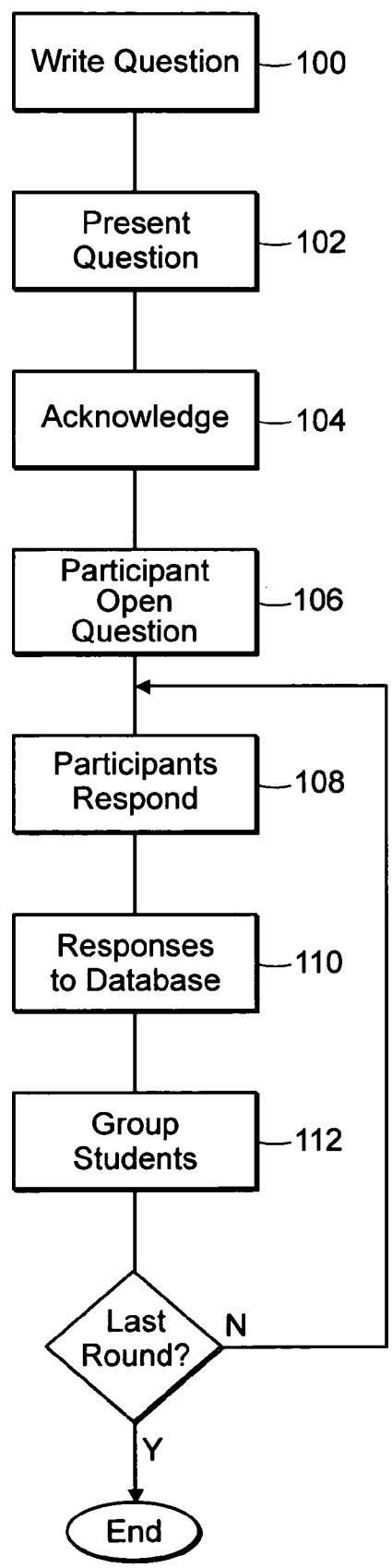
FIG. 3 is a flow chart showing a method by which questions are provided by moderators and responded to by participants.

Referring to FIG. 3, a method for controlling questions using question module 22 is described. The teacher first writes the question, specifies the question type, audience, number of rounds, and due date for that first round (100). The system presents the question, e.g., by sending students an email indication that the question is open, providing a link to a web response form, and providing a unique identification (ID) for email responses (102). The system acknowledges by responding to the teacher to indicate that the question has opened and identifying the parties or groups to whom the message has been sent (104).

The students receive the question by email and see it open on a current assignment page provided by a web server (106). The question also has a link to an appropriate form for answering the question.

The students respond to the question on the web or by email, and can further edit their answers until closing time (108). On receiving responses, the system processes answers and adds them to a database (110). The teacher can view these first round answers as they arrive. If responses are not received, the system can send email to everyone or can send email reminders only to those who have not responded by some time prior to closing. When the question closes, the system sends the answers to the archive. This is considered one round.

After the first round, the system can pair students who have answered according to a set of rules or criteria established by the teacher, for example, randomly, on alternate sides of a pro/con question (112), based on information provided in the answers, or based on information input during registration. The system can then provide one student's answer to the other paired student or students in the group with a request for a response from that other student, thereby creating a second round of comments. The system can then receive these second round responses and provide them to the students who provided the initial comments, to other members of the group, and/or to the teacher. Alternatively, the second-round responses can be routed to a different group of students. After the period for responding to the second round is closed, all of these answers are provided to the archives. The teacher, having received two sets of comments and responses, can have them all posted or can post a sampling of these answers that are particularly constructive. Some of the first round responses can be flagged by the teacher so as not to be routed to other students, if redundant or not appropriate.

The teacher can at any time cause certain answers or all answers to be routed to another individual with a specialty or interest in the area. This allows additional knowledgeable people to be involved in the coursework without requiring their full participation. This process can be performed on a response by response basis, or automatically for certain questions.

The system can allocate point units to students, allowing them tag interesting messages or opt out of assignments. These units can be of one or more types. For example, a student may be allowed units that can be used to "pay" to submit a late answer, or to skip a question entirely. Other units can to allow students to identify certain issues, questions, answers or set of responses as being of some significance, such that if enough students identify a particular question, answer or set of responses as being of interest, that group can be automatically promoted to the threaded messaging area for wider discussion or may be raised in class time or through some other chat or messaging session by the moderator.

Other features can be provided for the benefit and/or convenience of the teacher. For example, the teacher can have the ability to cut off a particular student from comments if not using the system properly. The system can also have a feature for scanning messages to highlight particular words or phrases, for example, to see if a student focused quickly on a correct concept, to identify the use of any inappropriate language, or to identify particular language indicating that additional follow-up or some more immediate response is appropriate.

Referring again to FIG. 1, select audience module 20 allows teachers to access database 30 through moderator interface 26 to view, categorize, and group students into pairs or larger groups. This grouping can be done randomly, based on fields captured during the registration process, or based on responses to certain types of questions as described above, but need not be limited to one particular course or, in the business context, team. Using the moderator interface 26, a moderator can allow other moderators to suggest groupings, including their participants, suggest groupings including the participants of other moderators and can approve suggested groupings. The teacher preferably can view all of the registered member information and use that information to create groups as desired. Alternatively, the select audience function can be automated, based on predefined criteria for grouping students based on registration information or other database information. These audiences can then be used to create the series of question, answer, and response interactions described above.

Threaded messaging module 16 allows teachers to create forms in which students can post and read comments via either email or entry in a box on a web page. The system is preferably database driven to allow messages to be grouped in database 30 by students and by subject. Threaded messaging module 16 can also be used for promotion of interesting question, answers or participant interactions to a wider audience for more general discussion either manually by a moderator or automatically as a result of participant collaborative filtering as outlined above.

Chat module 18 is a real time communication module that allows live discussion between or among students or among one or more students and a teacher. This module can thus allow a teacher to provide online office hours. In a moderated event, the moderator can receive comments and choose to make them available to the remainder of the group. In addition, the moderator can cut a student off from being able to send messages if appropriate. Chat module 18 respects the roles of the participants as defined in the registration module and restricts or enables functionality based on those roles. Chat module 18 can also dynamically generate chat spaces, allowing instant chat rooms for participants who are simultaneously online.

Having described preferred embodiments of the present invention, it should be apparent that modifications could be made without departing from the scope of the appended claims.

What is claimed is:

1. A method for organizing a dialogue of messages between a moderator and a number of participants in communication over a network comprising:
    providing, by the moderator, to the participants a question that solicits an answer;
    receiving from each of one or more sending participants a first-round answer in response to the question;
    grouping at least some of the participants into a plurality of groups;
    for at least a plurality of the sending participants, automatically sending the received first-round answer to one or more other receiving participants with whom the sending participant is grouped; and
    receiving from each of one or more of the receiving participants a follow-up response to the first-round answer from the sending participant.

2. The method of claim 1, wherein the groups are based on registration information entered by participants.

3. The method of claim 1, wherein the groups are created randomly.

4. The method of claim 1, wherein the groups are created based upon the first-round answers and after the first round answers are received.

5. The method of claim 1, further comprising repeating the following steps one or more times: sending one or more of the follow-up responses to one or more participants with whom the sender of the follow-up response is grouped and receiving from one or more of such participants who receive the follow-up response a follow-up response in response.

6. A computer readable storage medium including software for performing the method of claim 5.

7. The method of claim 1, further comprising receiving from at least some of the participants an indication that the question should be used for further discussion.

8. The method of claim 1, further comprising automatically routing answers from a particular round to a specialist in the subject matter of the message.

9. A computer readable storage medium including software for performing the method of claim 8.

10. The system of claim 1, wherein the question is provided with information indicating a number of rounds or responses and a due date for the first round.

11. The system of claim 1, wherein the question is one of a short answer question, poll, or multiple choice question, with a request for additional comments.

12. The system of claim 1, further comprising, after receiving the follow-up message, forming a new set of groups and providing the follow-up message for each participant to other participants in that participant's new group.

13. A computer readable storage medium including software for performing the method of claim 1.

14. A system for organizing messages created among a moderator and a number of participants in communication over a network, the system comprising:
    a select audience module for grouping at least some of the participants into groups;
    a question module for a moderator to provide to participants a question that solicits an answer, receiving from each of one or more of the participants a first-round answer in response to the question, for at least a plurality of the sending participants, automatically sending the first-round answer to one or more other receiving participants with whom the sender of the message is grouped into one of a plurality of groups, and receiving from one or more of the receiving participants a response to the answer received by the receiving participant.

15. The system of claim 14, wherein the system can repeat the process of receiving and sending messages among grouped participants as desired.

16. The system of claim 14, wherein the select audience module groups participants randomly.

17. The system of claim 14, wherein the select audience module groups participants based on the answer sent in response to the question.

18. The system of claim 14, further comprising a chat module that allows participants to send messages in real time over the network while respecting usage rules based on user roles.

19. The system of claim 14, further comprising a threaded messaging module that allows messages to be sent, posted, and archived.

20. The system of claim 14, wherein messages can be promoted from the question module to the threaded messaging module.

21. The system of claim 14, further comprising a chat module that allows participants to send messages in real time over the network, and a threaded messaging module that allows messages to be sent, posted, and archived.

22. The system of claim 14, further comprising a registration module for obtaining participant registration information.

23. The system of claim 22, wherein the select audience module uses registration information to group participants.

* * * * *